March 16, 1954  T. W. CROCKETT  2,672,356
IRRIGATION PIPE LINE COUPLING
Filed Sept. 28, 1950  2 Sheets-Sheet 1

INVENTOR
THOMAS W. CROCKETT

BY Adams, Forward & McLean
ATTORNEY

March 16, 1954  T. W. CROCKETT  2,672,356
IRRIGATION PIPE LINE COUPLING
Filed Sept. 28, 1950  2 Sheets-Sheet 2
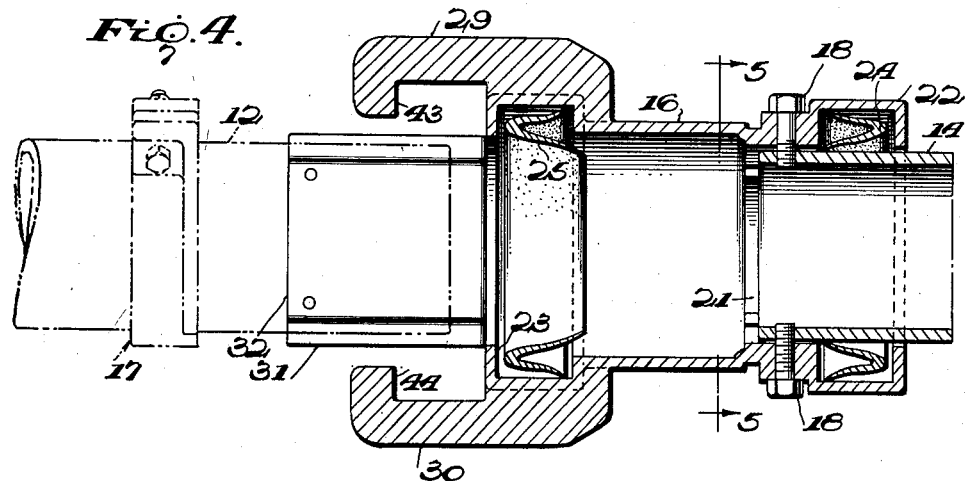
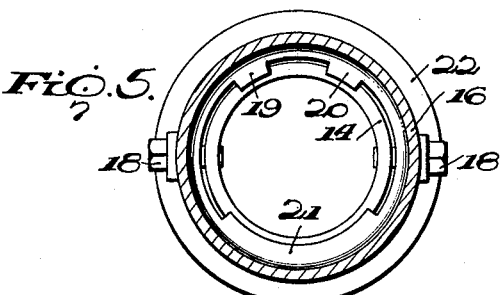
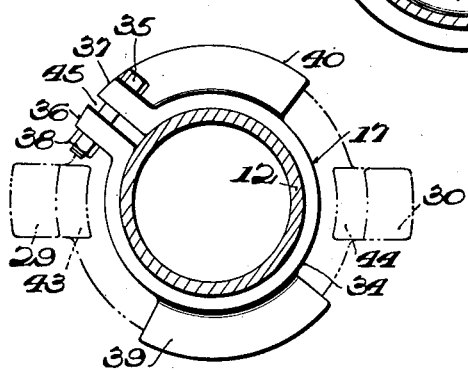
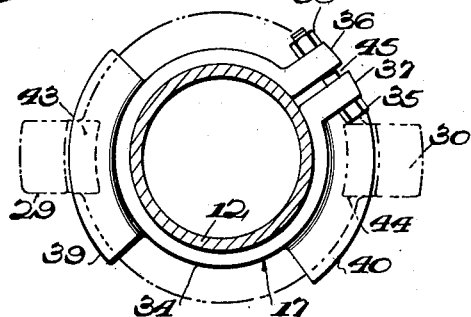
INVENTOR
THOMAS W. CROCKETT
BY Adams, Forward & McLean
ATTORNEY Patented Mar. 16, 1954

2,672,356

UNITED STATES PATENT OFFICE 2,672,356

IRRIGATION PIPE LINE COUPLING

Thomas W. Crockett, Williamston, N. C., assignor to Mathieson Chemical Corporation, a corporation of Virginia Application September 28, 1950, Serial No. 187,234

1 Claim. (Cl. 285—175)

This invention relates to an irrigation pipe line which comprises a plurality of pipe sections detachably coupled together, and more particularly this invention relates to a new and novel coupling device which facilitates the coupling and uncoupling of the pipe sections at a distance removed from the coupling means, whereby a single person may easily and efficiently couple one length of pipe to another while at the carrying position.

In the irrigation of crops by means of a portable pipe line, the labor cost of periodic movement of the pipe line to different positions presents a tremendous and sometimes prohibitive economic hurdle to the farmer. Since the labor cost of moving a pipe line is a direct function of the time required for the crucial coupling and uncoupling operation, a considerable sum of money has been spent in the search for a coupling means which would require a minimum of repairs, be easily and rapidly operable at a distance, and have a uniquely simplified, rugged and economical design. The present invention comprises features which completely satisfy the above requirements and especially the need for a coupling means which is rapidly operable at a distance without need for perfect alignment of the pipe sections. In other words the present invention has aided materially in reducing the time required for movement of an irrigation pipe line from one position to another.

This is accomplished by a coupling means which does not require accurate alignment for coupling and uncoupling and which may be operated from a pipe holding and carrying position at the middle of a pipe section, a distance of about ten feet from the end to be coupled. The coupling means includes a coupler comprising a pair of oppositely disposed fixed claws having inturned end portions which coact with a coupling ring having widely spaced arcuate ear portions to couple two pipe sections together. As will be explained hereinafter the new and novel design of the ear portions and the claws provides a compensating feature for the inevitable misalignment resulting from coupling pipe sections at a location removed from the coupling means.

The various objects and features of the invention will be fully understood from the detailed description of a typical preferred form and application of the invention, throughout which description reference is made to the accompanying drawings in which:

Fig. 4 is a horizontal section of the coupler of the instant invention and includes in phantom the pipe section to be coupled therein;

Fig. 5 is a vertical section of the coupler taken on line 5—5 of Fig. 4;

Fig. 6 is an end view of the coupling ring taken on line 6—6 of Fig. 3 and showing the position of the ring prior to coupling rotation, the coupler claws being shown in phantom;

Fig. 7 is a view somewhat similar to Fig. 6 but showing the position of the ring after coupling rotation.

Figure 1:
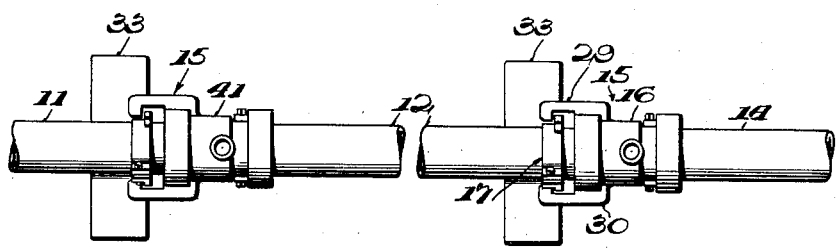
Fig. 1 is a plan view of a part of an irrigation pipe line.
Figure 2:
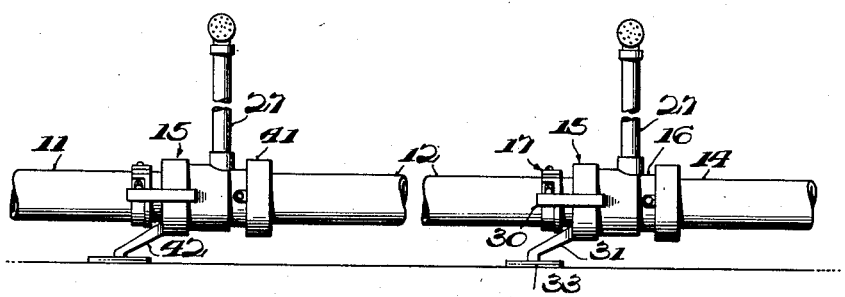
Fig. 2 is a side elevation of the pipe line.

In the drawings Figs. 1 and 2 show an irrigation pipe line which is made up of a plurality of aluminum pipe lengths 11, 12 and 14 connected together by the coupling means 15 of the instant invention. As more clearly seen in Figs. 3 and 4, one part of the coupling means 15 comprises a cast aluminum coupler 16 which is rigidly connected to a first pipe length 14 by means of machine bolts 18 which are threaded into the tapped pipe length 14. As shown in Fig. 5, a plurality of arcuate stop means 19, 20 and 21 are provided in the coupler 16 for properly positioning the pipe length 14 before the drilling and tapping operation of the holes for bolts 18 and also to facilitate the removal and replacement of the pipe length 14. At the ends of the coupler 16 are provided first and second end sealing means which comprise annular sets 22 and 23 respectively which form chambers for the reception and retention of V-shaped, resilient gaskets 24 and 25 respectively.

An internally threaded boss 26 is provided at the middle portion of the coupler 16 by means of which risers or spray conduits 27 may be connected to the coupler. Horizontally and longitudinally extending from the annular seat 23 are oppositely disposed claws 29 and 30 having inturned end portions 43 and 44 which coact with a brass coupling ring 17, the second part of the coupling means 15, to couple the first and second pipe lengths 14 and 12 together, the coupling ring 17 being positioned a sufficient distance from the end of the second pipe length 12 to allow insertion of the pipe 12 beyond the gasket 25. A ramp 31 is connected to the bottom of the coupler 16 to provide guide means for the insertion of the pipe section 12 therein and also to form a base 32 which may be attached to a board 33 to counteract the high rotational thrust of the spray conduits 27 during usage.

Figure 3:
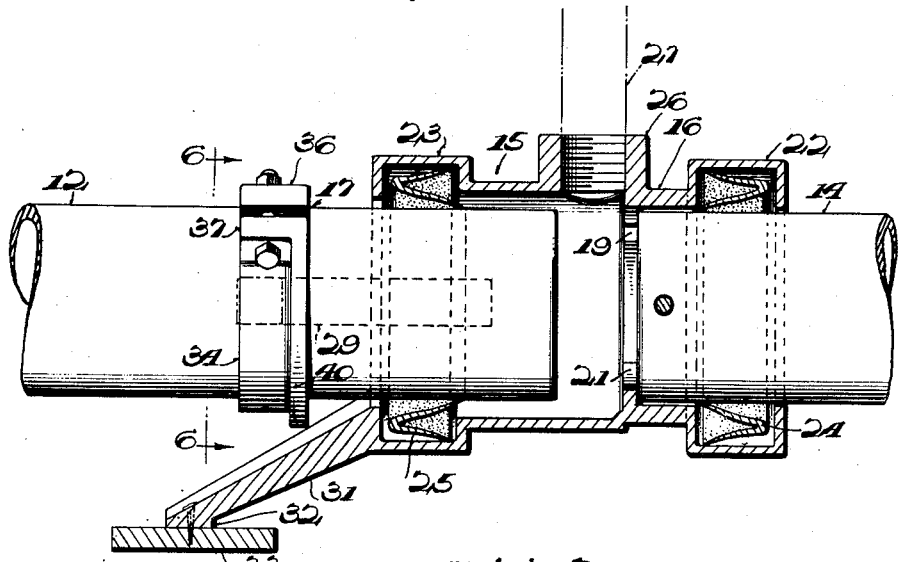
Fig. 3 is a side elevation of the coupling means of the instant invention partly in section.

As seen in Figs. 3, 6 and 7, the coupling ring 17 has a split tubular portion 34 which forms a longitudinal slot 45 and is drawn into tight frictional engagement with the pipe length 12 by means of a bolt 35 which passes through lugs 36 and 37 and is threaded into the nut 38. A pair of oppositely disposed arcuate ears 39 and 40 extend radially from opposite quadrants of the tubular portion 34 and may be easily slid past the slender claws 29 and 30 for clockwise rotation into engagement therewith. The tightening means 35 provides a stop means which abuts against the inturned portion 44 of the claw 30 thereby limiting coupling rotation of the coupling ring 17 and preventing accidental rotation of the ears 39 and 40 out of engagement with their respective claws 29 and 30.

As may be noted in the drawings the clearance between the coupling ring 17 and the coupler 16 is substantial. By this arrangement a pipe section which is to be coupled to a pipe line may be centrally held by a man in a standing position and then tilted downwardly to allow insertion of the pipe into the coupler 16. By attaching the coupling ring 17 to the pipe in a manner such that the lugs 36 and 37 are easily visible on the upper portion of the pipe 12 as shown in Fig. 6, the job of aligning the spaces between the ears 39 and 40 with the claws 29 and 30 is simple and speedy since the spaces or passageways between the ears 39 and 40 are relatively large in comparison to the dimension of the slender claws 29 and 30 which must be received therethrough. When the pipe 12 has been inserted into the coupler, a clockwise rotation of the pipe will bring the ears 39 and 40 into engagement with the claws 29 and 30 respectively and the tightening means 35 will abut against the claw 30 to prevent further inadvertent clockwise rotation. A coupler 41 which is similar to coupler 16 and attached to the other end of pipe 12 will be in an upright position upon completion of the above rotational movement of pipe 12, thereby placing its ramp 42 flatly on the ground in position for receipt of another pipe section 11.

The design of the coupling ring 17 provides two diametrically opposed passageways, each being substantially a quadrant of the coupling ring 17 in width. The ear 40 functions as a control ear in that its connections to lug 37 serves to limit the coupling rotation as well as longitudinal movement, the second ear 39 serving also as a means for preventing longitudinal movement.

These features provide means whereby the time and effort required in coupling and uncoupling sections of an irrigation pipe line are reduced to a minimum.

I claim:

A device for coupling two lengths of irrigating pipe together comprising a coupler having annular gasket seats formed at each end and a threaded boss at its middle portion for attachment to a spray conduit, bolt means at one end of said coupler for rigidly attaching said coupler to a length of irrigating pipe, stop means positioned inwardly of said bolt means for limiting inward movement of said pipe, a pair of diametrically opposed finger-like claws extending longitudinally from the other end of said coupler in a horizontal plane, said claws having inturned end portions defining a space sufficient for the easy passage of a second irrigating pipe; and a coupling ring mounted near the end of said second pipe having a split tubular portion forming a longitudinal slot, a pair of lugs integral with said tubular portion and extending outwardly on each side of said slot tightening means connected to said lugs for clamping said ring on said second pipe, a control ear integral with one of said lugs and integral with and extending outwardly from the periphery of the quadrant of the inner end of said tubular portion adjacent to said lug, a second ear integral with and extending outwardly from the periphery of the quadrant of the inner end of said tubular portion diametrically opposed to said control ear quadrant, said control ear and its integral lug forming indicia means for the proper orientation of said second pipe for insertion past the claws, and said tightening means upon coupling rotation abutting an inturned end portion of said claws thereby arresting rotation when the coupling ring reaches the fully coupled position.

THOMAS W. CROCKETT.

References Cited in the file of this patent

UNITED STATES PATENTS

| Number | Name | Date |
| --- | --- | --- |
| 1,323,117 | Stove | Nov. 25, 1919 |
| 1,881,508 | Gredell | Oct. 11, 1932 |
| 2,170,010 | Conner | Aug. 22, 1939 |
| 2,494,855 | Anderson | Jan. 17, 1950 |

FOREIGN PATENTS

| Number | Country | Date |
| --- | --- | --- |
| 867,521 | France | Aug. 4, 1941 |